(12) United States Patent
Bianco et al.

(10) Patent No.: US 12,468,625 B2
(45) Date of Patent: *Nov. 11, 2025

(54) SEPARATE CORES FOR MEDIA MANAGEMENT OF A MEMORY SUB-SYSTEM (71) Applicant: Micron Technology, Inc., Boise, ID (US)

(72) Inventors: Antonio David Bianco, Boise, ID (US); John Paul Traver, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,814

(22) Filed: May 2, 2024

(65) Prior Publication Data
US 2024/0281372 A1   Aug. 22, 2024

Related U.S. Application Data (63) Continuation of application No. 17/675,746, filed on Feb. 18, 2022, now Pat. No. 12,001,330, which is a
(Continued)

(51) Int. Cl.
G06F 12/02 (2006.01)
G06F 9/54 (2006.01)
G06F 12/0891 (2016.01)

(52) U.S. Cl.
CPC .......... G06F 12/0246 (2013.01); G06F 9/546 (2013.01); G06F 12/0253 (2013.01); G06F 12/0891 (2013.01); G06F 2212/7209 (2013.01)

(58) Field of Classification Search
CPC .. G06F 12/0246; G06F 9/546; G06F 12/0253; G06F 12/0891; G06F 2212/7209;
(Continued)

(56) References Cited

U.S. PATENT DOCUMENTS 4,775,932 A   10/1988   Oxley et al.
7,774,389 B2   8/2010   Stephens et al.
(Continued)

FOREIGN PATENT DOCUMENTS

CN   103593315 A   2/2014
CN   104903842 A   9/2015
(Continued)

OTHER PUBLICATIONS

Chinese patent office, "CN Notice of Allowance, including Search Report," issued in connection with China Patent Application No. 202011550335.2 dated Aug. 22, 2024 (8 pages total; 4 pages original & 4 pages machine translation).
(Continued)

Primary Examiner — Tim T Vo
Assistant Examiner — Richard B Franklin
(74) Attorney, Agent, or Firm — Holland & Hart LLP (57) ABSTRACT Methods, systems, and devices for separate cores for media management of a memory sub-system are described. A controller of a memory sub-system can include a first processing core and a second processing core for a garbage collection procedure. The first processing core can perform a first set of one or more operations associated with a read process of a first stage of a garbage collection procedure for a plurality of transfer units of the memory sub-system. The second processing core can perform a second set of one or more operations associated with a write process of the first stage of the garbage collection procedure, where the second set of one or more operations are concurrent with the first set of one or more operations.

20 Claims, 5 Drawing Sheets

Related U.S. Application Data continuation of application No. 16/730,886, filed on Dec. 30, 2019, now Pat. No. 11,275,679.

(58) Field of Classification Search
CPC ..... G06F 2212/7211; G06F 2212/7205; G06F 2212/1032
See application file for complete search history.

(56) References Cited

U.S. PATENT DOCUMENTS

| | | |
|---|---|---|
| 10,255,179 B2 | 4/2019 | Ji et al. |
| 10,379,758 B2 | 8/2019 | Cheng et al. |
| 10,621,085 B2 * | 4/2020 | Xue .................. G06F 12/02 |
| 10,936,483 B2 | 3/2021 | Nilsen |
| 11,593,262 B1 | 2/2023 | Henze et al. |
| 2012/0117309 A1 | 5/2012 | Schuette |
| 2014/0304460 A1 | 10/2014 | Carlson et al. |
| 2015/0234612 A1 | 8/2015 | Himelstein et al. |
| 2015/0268860 A1 | 9/2015 | Yum et al. |
| 2016/0291883 A1 | 10/2016 | Manohar et al. |
| 2017/0103030 A1 | 4/2017 | Luo |
| 2018/0024921 A1 | 1/2018 | Kanno |
| 2018/0173442 A1 | 6/2018 | Kirkpatrick et al. |
| 2018/0260136 A1 | 9/2018 | Huo et al. |
| 2019/0179747 A1 | 6/2019 | Kim |
| 2020/0409836 A1 | 12/2020 | You |

FOREIGN PATENT DOCUMENTS

| | | |
|---|---|---|
| CN | 104951248 A | 9/2015 |
| CN | 105339905 A | 2/2016 |
| CN | 106569727 A | 4/2017 |
| CN | 107589958 A | 1/2018 |
| CN | 108572796 A | 9/2018 |
| CN | 110023896 A | 7/2019 |
| CN | 110275673 A | 9/2019 |
| CN | 110515547 A | 11/2019 |
| CN | 110515859 A | 11/2019 |
| WO | 2014/105829 A2 | 7/2014 |

OTHER PUBLICATIONS

Chinese patent office, "China Office Action," issued in connection with China Patent Application No. 202411467241.7 dated May 2, 2025 (11 pages) (4 pages of English Translation and 7 pages of Original Document).

* cited by examiner

SEPARATE CORES FOR MEDIA MANAGEMENT OF A MEMORY SUB-SYSTEM

CROSS REFERENCE

The present application for patent is a continuation of U.S. patent application Ser. No. 17/675,746 by Bianco et al., entitled "SEPARATE CORES FOR MEDIA MANAGEMENT OF A MEMORY SUB-SYTEM," filed Feb. 18, 2022, which is a continuation of U.S. patent application Ser. No. 16/730,886 by Bianco et al., entitled "SEPARATE CORES FOR MEDIA MANAGEMENT OF A MEMORY SUB-SYTEM," filed Dec. 30, 2019, each of which is assigned to the assignee here of, and each of which is expressly incorporated by reference in its entirety herein.

TECHNICAL FIELD

The following relates generally to a memory sub-system and more specifically to separate cores for media management of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to separate cores for media management of a memory sub-system in accordance with some examples of the present disclosure. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory device controller and the corresponding page (e.g., the page on which the valid data is contained) is erased. The valid data can be written (e.g., re-written) to the memory device (e.g., to a different page of the memory device) prior to erasing the page on which the valid data is contained. In order to write the valid data to a location (e.g., a different page of the memory device), write commands are issued by the memory sub-system controller, each write command indicating a memory address (e.g., a destination memory address) to which the valid data is to be written. In some garbage collection procedures, the write commands are issued once the corresponding read command has been completed. That is, a read command for data at a source memory address (e.g., a memory address on a page to be erased).

In a traditional memory sub-system, the controller can include a single processing core. The single processing core can perform operations associated with a read process of the garbage collection procedure and a write process of the garbage collection procedure. In such cases, the memory sub-system can include an increased amount of overhead such that the single processing core of the controller performs every operation of the garbage collection procedure. That is, the algorithm of the single processing core of the controller can increase processing times as a result of the single processing core utilizing processor cycles for multiple processes of a garbage collection procedure such as identifying memory addresses for garbage collection and determining if the data is dirty or stale data. In some cases, finding valid data, reading the valid data, and preparing the valid data to be written can utilize multiple processor cycles.

Such techniques (e.g., utilizing a single processing core) can result in the memory sub-system experiencing a performance loss during a garbage collection procedure, which can increase the latency of other operations and the time utilized for garbage collection. The memory sub-system including the single core processor can decrease the overall performance of the memory sub-system, which can result in experiencing impaired read, write, and erase speeds (e.g., due to a delay in read, write, or erase operations).

Aspects of the present disclosure address the above and other deficiencies by having a memory sub-system that includes separate processing cores for the garbage collection procedure, thereby sharing responsibilities between multiple cores to improve the performance of the memory sub-system during a garbage collection procedure. For example, the memory sub-system can include two (or more) processing cores in the controller. In such cases, the addition of a second processing core can enable the controller to handle multiple operations associated with the garbage collection procedure by dividing the operations between the two processing cores. For example, the two processing cores can each perform different operations for the garbage collection procedure in parallel (e.g., concurrently or simultaneously). That is, one processing core can perform operations associated with a read process of the garbage collection procedure, and another processing core can perform a write process of the garbage collection procedure.

By offloading computational processes to a separate core (e.g., a second processing core), the memory sub-system can perform operations in parallel, thereby improving the performance of the memory sub-system, improving the quality of service, and increasing the read, write, and erase speeds. Implementing separate cores for the garbage collection procedure can improve the overall efficiency of the memory sub-system, which can result in memory sub-system experiencing improved processing times.

Features of the disclosure are initially described in the context of a computing environment as described with reference to FIG. 1. Features of the disclosure are described in the context of method and block diagrams as described with reference to FIGS. 2-4. These and other features of the disclosure are further illustrated by and described with reference to a computer system that relates to separate cores for media management of a memory sub-system as described with reference to FIG. 5.

Figure 1:
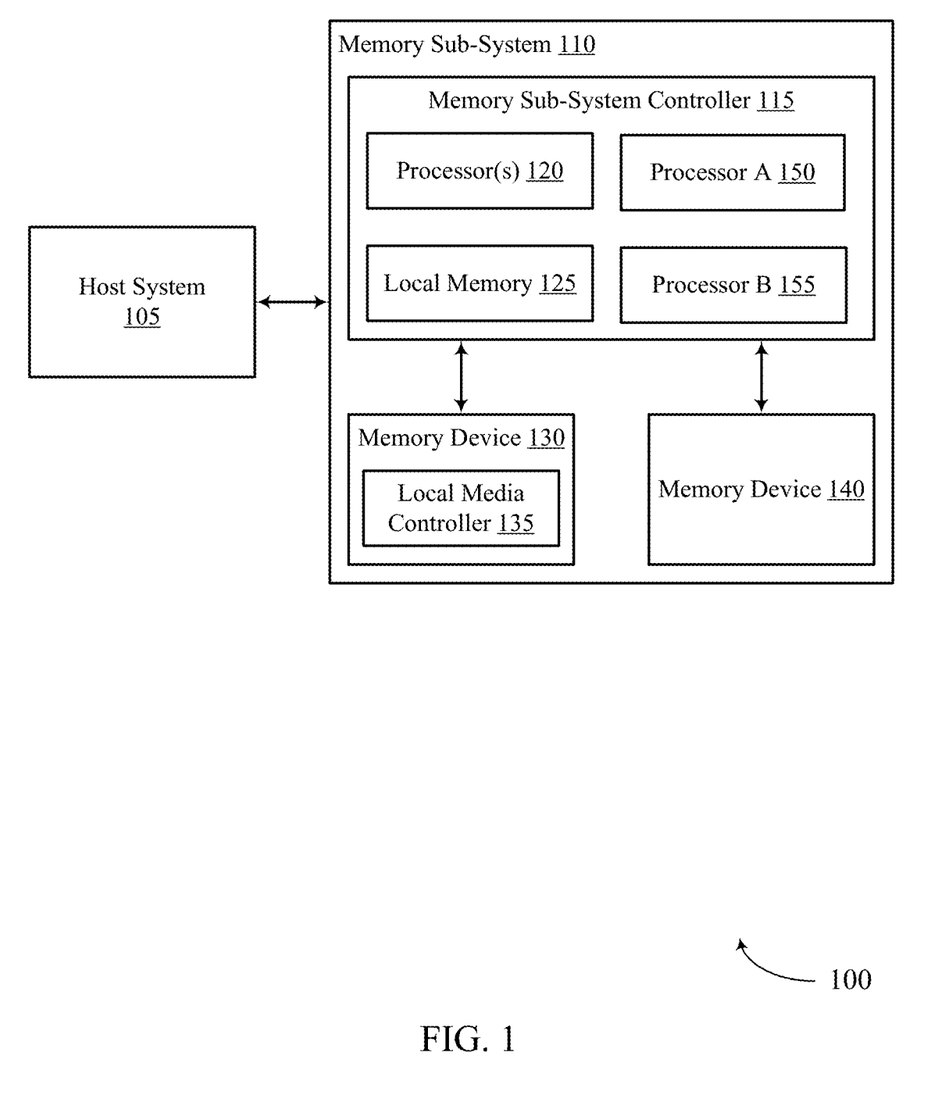
FIG. 1 illustrates an example of a computing system that includes a memory sub-system in accordance with some examples of the present disclosure.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), negative-or (NOR) flash memory, Spin Transfer Torque (STT)-MRAM, conductive bridging RAM (CBRAM), resistive random access memory (RRAM), oxide based RRAM (OxRAM), and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor(s) 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes multiple processors 120 such as processor A 150 and processor B 155. Processor A 150 can include an input/output (I/O) core, and processor B 155 can include a Flash Translation Layer (FTL) core 160. The processor A 150 can perform operations associated with one process (e.g., a read process) of a garbage collection procedure for blocks of data (e.g., transfer units (TUs)) of the memory sub-system. The processor B 155 can perform operations associated with another process (e.g., a write process) of the garbage collection procedure such that the operations associated with the write process can be performed concurrent with the operations associated with the read process. By splitting up the garage collection procedures between two processing cores, the processor A 150 and processor B 155 can perform the operations in parallel.

In some examples, the memory sub-system controller 115 includes at least a portion of the processor A 150 and processor B 155. For example, the memory sub-system controller 115 can include a processor(s) 120 (e.g., a processing device) configured to execute instructions stored in local memory 125 for performing the operations described herein. In some examples, the processor A 150 and processor B 155 is part of the host system 105, an application, or an operating system.

In traditional systems, an increase in processing times can be contributed to by the overhead associated with identifying blocks of data for the garbage collection procedure. For example, the memory sub-system controller 115 can scan through multiple blocks of data for numerous iterations, thereby increasing the processing times of the memory sub-system 110. By implementing the I processor A 150 and the processor B 155, the processor B 155 can perform operations associated with a portion of the garbage collection procedure (e.g., the write process of the garbage collection procedure) without the overhead attributed to waiting for the operations of other portions of the garbage collection procedure (e.g., read process of the garbage collection) procedure to be completed. Further details with regards to the operations of the processor A 150 and processor B 155 are described below.

Figure 2:
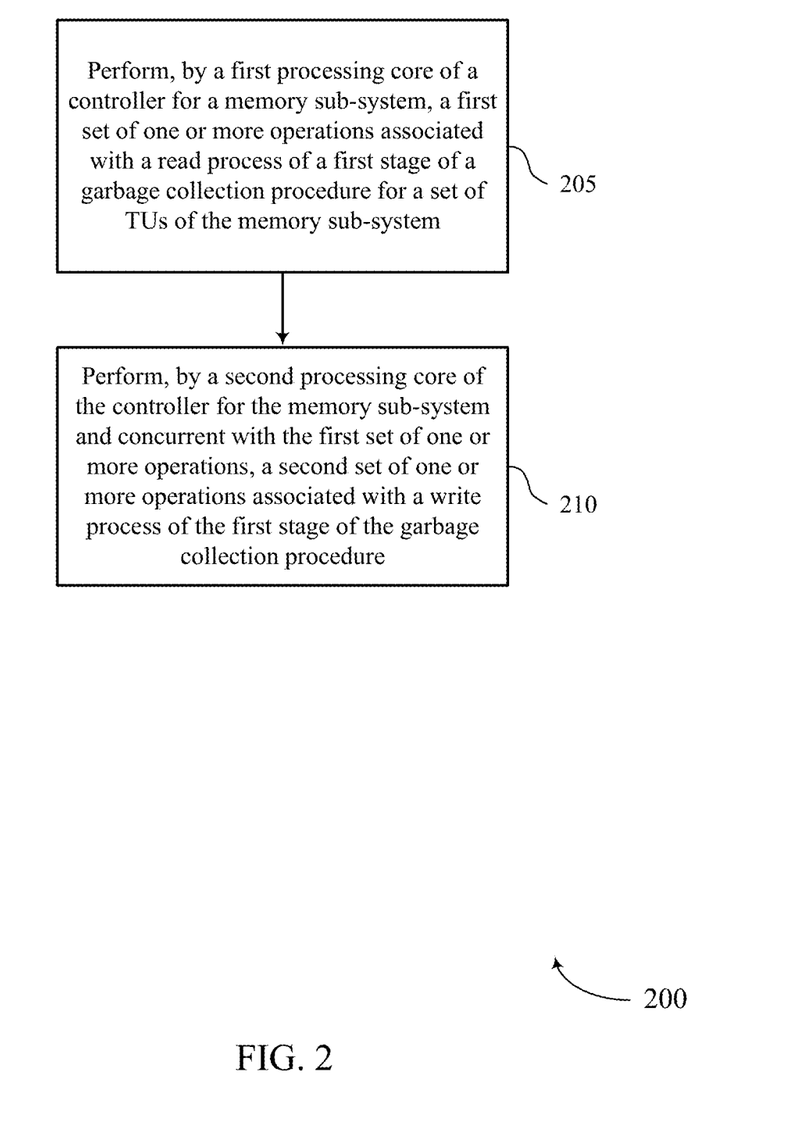
FIG. 2 is a method diagram of an example method for separate cores for media management of a memory sub-system in accordance with some examples of the present disclosure.

FIG. 2 is a method diagram of an example method 200 for utilizing separate cores for media management of a memory sub-system in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the processor A 150 and processor B 155 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device can perform, by a first processing core of a controller for a memory sub-system, a first set of one or more operations associated with a read process of a first stage of a garbage collection procedure for a set of TUs of the memory sub-system. In some examples, the first set of one or more operations can include identifying respective source addresses for the set of TUs of the memory sub-system, where each of the set of TUs comprises valid data. In some examples, the first set of one or more operations can include issuing a set of read commands in connection with the garbage collection procedure, each read command comprising an instruction to read one of the set of TUs at a respective source address of the memory subsystem. In some examples, the set of TUs can correspond to a set of data, and the first set of one or more operations can include assigning the set of data to a purgatory state based at least in part on the set of data containing invalid data.

In some examples, the method 200 can include executing, by a first processing core of the processing device, one or more read operations associated with a first stage of a garbage collection procedure for the set of memory components. In some examples, the method 200 can include sending, as part of the one or more read operations, a write request for a first TU of the set of TUs to a first write request queue of a set of write request queues, the first write request queue associated with a first priority level different from a second priority level for a second write request queue of the set of write request queues.

At operation 210, the processing device can perform, by a second processing core of the controller for the memory sub-system and concurrent with the first set of one or more operations, a second set of one or more operations associated with a write process of the first stage of the garbage collection procedure. In some examples, the second set of one or more operations can include assigning the set of data in the purgatory state to an erase pool based at least in part on completion of all read commands for the set of data. In some examples, the second set of one or more operations can include issuing a set of write commands in connection with the garbage collection procedure, each write command comprising an instruction to write one of the set of TUs to a respective destination address of the memory sub-system. In some examples, the set of write commands can be issued in accordance with a write rate for the garbage collection procedure. In some examples, the set of write commands can be issued based at least in part on a respective priority level for each of the set of write commands.

In some examples, the method 200 can include executing, by a second processing core of the processing device and concurrent with the one or more read operations, one or more write operations associated with the first stage of the garbage collection procedure. In some examples, the method 200 can include performing, as part of the one or more write operations, a flush operation for one or more TUs of the set of TUs, the flush operation for the one or more TUS being associated with a first write request queue having a higher priority than a second write request queue.

In some examples, the method 200 can include filling, as part of the one or more write operations, a one or more TUs (e.g., a memory page or a block of data) for a flush operation with a portion of data from at least one TU of the set of TUs, where the one or more TUs are associated with respective write requests in a first or second write request queue.

Figure 3:
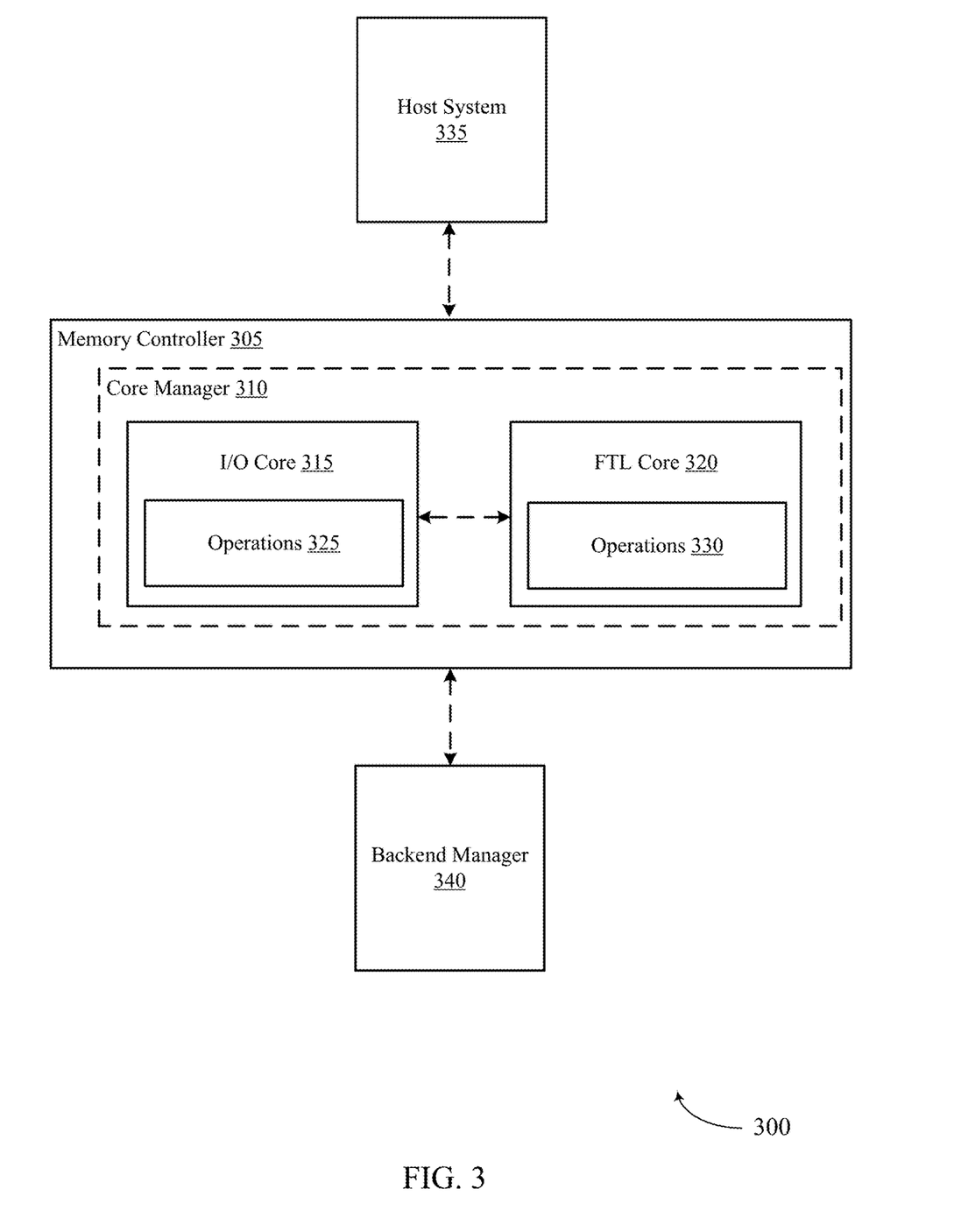
FIG. 3 is a block diagram of an example system in which separate processing cores for garbage collection can operate.

FIG. 3 is a block diagram 300 of an example system in which separate processing cores for garbage collection can operate. The block diagram 300 can include memory controller 305. Memory controller 305 can include core manager 310 which can include I/O core 315 and FTL core 320. In some examples, the I/O core 315 can correspond to processor A 150 described with reference to FIG. 1. In some examples, the FTL core 320 can correspond to processor B 155 described with reference to FIG. 1. The block diagram 300 can also include host system 335 and backend manager 340.

In some examples, core manager 310 can include multiple processing cores. For example, core manager can include I/O core 315 and FTL core 320. The I/O core 315 can perform operations 325 associated with a read process of a garbage collection procedure, and in parallel (e.g., at a same time or overlapping in time), the FTL core 320 can perform operations 330 associated with a write process of the garbage collection procedure. In some cases, the I/O core 315 can be in communication with the FTL core 320.

In some cases, the I/O core 315 or FTL core 320 can enable or disable the garbage collection procedure during operations 325. For example, the I/O core 315 can maintain a threshold number of blocks of data undergoing the garbage collection procedure. The threshold can include a number of blocks of data under which the garbage collection procedure can be enabled. The enablement of the garbage collection procedure can be communicated between the I/O core 315 and FTL core 320. For example, the enablement can be communicated via advertising of the current garbage collection write rate from the I/O core 315 to the FTL core 320.

The operations 325 of the I/O core 315 can select a garbage collection procedure mode. For example, the mode can indicate what set of data can be identified for the garbage collection procedure (e.g., an operational mode) as well as the rate at which the garbage collection procedure of the set of data can occur (e.g., a run mode). In some examples, static wear leveling can be communicated by advertising the current operational mode from the I/O core 315 to the FTL core 320. In such cases, the I/O core 315 can control the rate of garbage collection without controlling the identification of the set of data, thereby allowing the FTL core 320 to perform other operations simultaneously. In other examples, the I/O core 315 or the FTL core 320 can predict the effort to perform the garbage collection procedure on the valid data. The prediction can be used for resource balancing and rate control.

In some examples, the rate at which the garbage collection procedure of the set of data can occur (e.g., run mode) can be calculated by the I/O core 315. While the rate can be computed for the host-write domain (e.g., host system 335) and at a frequency based on the host-write domain, the overhead to perform this calculation can remain outside of the write data path. In some cases, P2L drops can be read from media into a buffer to find valid data within the set of data.

The operations 325 of I/O core 315 can include a trigger to select blocks of data for the garbage collection procedure. The algorithm to select the blocks of data can be included in a set of data management module within I/O core 315. The I/O core 315 can also identify when a new set of data can be selected for the garbage collection procedure. For example, the new set of data can be identified when the valid TU count (VTC) of the current set of data is zero. The VTU can be an example of a number of TU's in a set of data that can be mapped as valid data that can be referenced by the host system 335. In some cases, the new set of data can be identified when the garbage collection procedure iterates through every P2L entry for the set of data.

In some examples, the I/O core 315 can locate valid data (e.g., identify a source address). The source address of the valid can be found on the media while the valid data count of the set of data can be available. In some examples, the I/O core 315 can read valid data. For example, once the source address of the valid data can be identified, a read process can be issued to copy the data from media into an intermediate buffer. In such cases, the I/O core 315 can issue a read command in connection with the garbage collection procedure to read the set of data at the source address.

The operations 325 of the I/O core 315 can issue a write request. When a read process is completed, a write process of the set of data can be issued to move the set of data to a different location on the media. Write requests can be queued up in advance such that the FTL core 320 does not to wait when the garbage collection procedure is needed. In some cases, the write requests can be inserted into the queue based on a priority of the write request. In such cases, the I/O core 315 can send a write request for the set of data to the write request queue. The write request can be associated with a priority level different from a priority level of a different write request. A full write request queue can result in backpressure that throttles garbage collection procedure read pipeline stages. The location on the media can be included with the write request to allow for conditional mapping table updates such as logical to physical (L2P)/VTC updates with garbage collection write requests.

In some examples, the operations 325 of the I/O core 315 can maintain a sequence of write requests. For example, the write requests received to move the set of data can be issued in the order that the set of data was originally written by the host system 335 such that performance is similar between blocks of data in the garbage collection procedure and the blocks of data without garbage collection. In some cases, the I/O core 315 can detect blocks of data with invalid data. In such cases, blocks of data with invalid data do not undergo a garbage collection procedure, a garbage collection procedure for the block of invalid data can be stopped, or both. The I/O core 315 can assign the set of data to a purgatory state if the set of data contains invalid data.

The core manager 310 can include a second processing core. For example, the core manager 310 can include the FTL core 320 which can perform operations 330. Operations 330 can include ensuring that the garbage collection write rate relative to host system 335 write rate is on the low priority garbage collection write request queue. In some cases, a write command can be issued by the FTL core 320. In such cases, the write command can be issued based on the garbage collection write rate. In other examples, the write command can be issued based on a priority level of the write command as compared to a priority level of other write commands.

In some cases, there can be one or more request queues between cores from which requests may be pulled by the receiving core in a prioritized order. For example, the FTL core 320 can facilitate flush requests from clients on the high priority garbage collection write request queue. In such cases, the FTL core 320 can perform a flush operation for the set of data where the flush operation can be associated with the write request queue having a higher priority (e.g., high priority garbage collection write request queue) than a different write request queue (e.g., low priority garbage collection write request queue). The FTL core 320 can fill the set of data for the flush operation with data from other blocks of data.

In the example including two write request queues (e.g., high priority garbage collection write request queue and low priority garbage collection write request queue), garbage collection procedure flushes can be inserted or assigned into the lowest priority queue such that all work (e.g., commands, requests, host operations) that precedes the flush request can be complete before the flush request is seen and processed by the processor of the core manager 310 performing the writes. In some cases, the flush request can be added to the high priority request queue when all data that the client (e.g., garbage collection or other internal writes) has requested to be written and flushed was also submitted to the high priority request queue.

Flushes can use pad data or be filled with additional user data from one of the garbage collection write request queues if the user data is available. If there is no additional user data available, using pad data can be acceptable. Pad data can be garbage data added to back-end commands to meet an aggregation criteria for the operation. Garbage data can be a fixed pattern, stale data from other buffers, or both. In some cases, pad data cannot be user data. In some cases, completion responses for flushes can be sent if requested for asynchronous power loss (APL) safety. For example, if the power is removed without the host system notifying the drive that power loss is imminent, or without sufficient up-time after such a notification, it can be referred to as an APL event. In other examples, the FTL core 320 can facilitate conditional L2P/VTC/journal updates after garbage collection procedure writes are completed.

The backend manager 340 can be in communication with the memory controller 305. For example, the backend manager 340 can send a read response to the memory controller 305. In such cases, backend manager 340 can transmit a message indicating that the entire set of data is read, and the invalid data can be erased. For example, the backend manager 340 can communicate with the FTL core 320 to assign the set of data in the purgatory state to an erase pool based on completing all read commands for the set of data.

Figure 4:
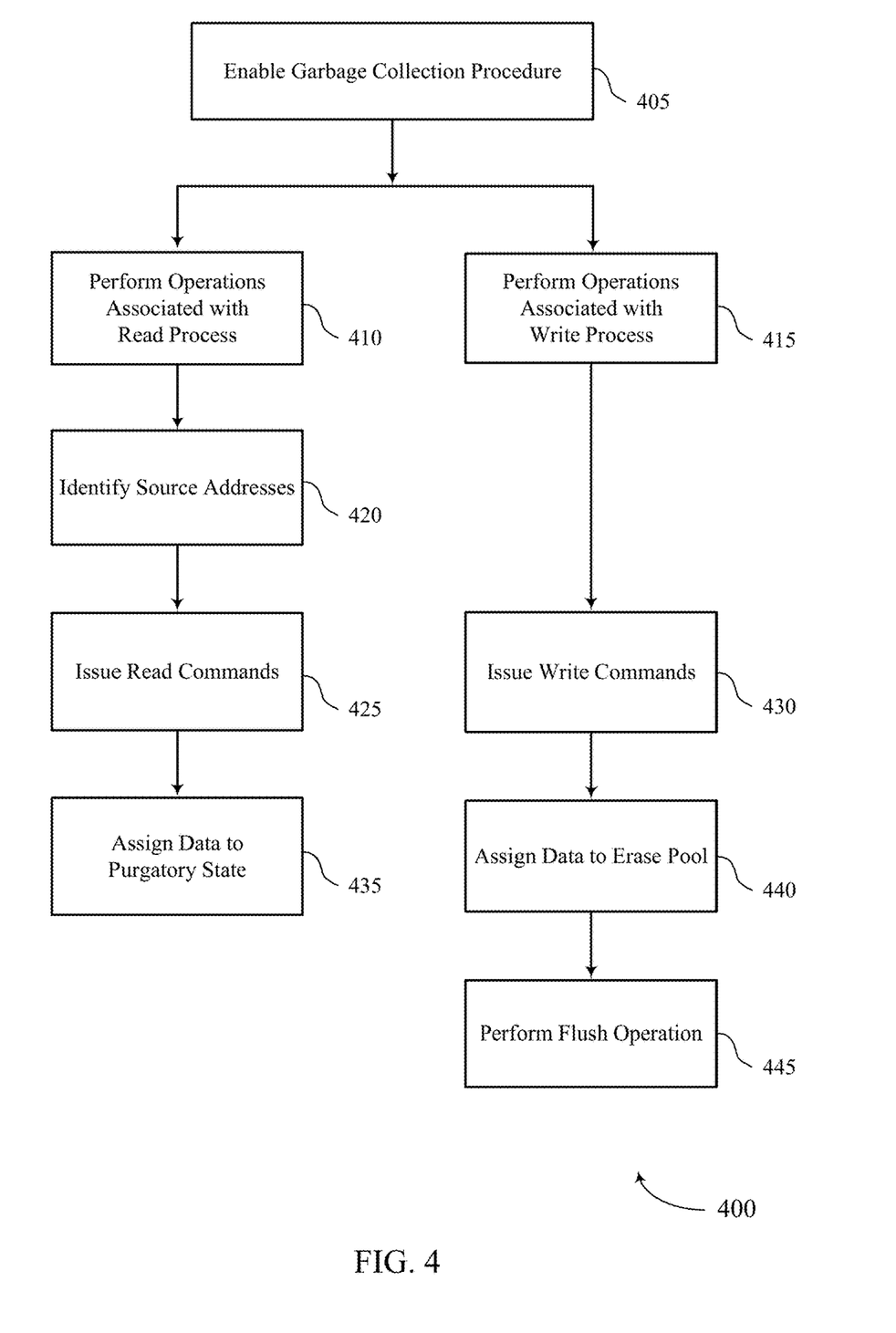
FIG. 4 is a method diagram of an example method for separate cores for media management of a memory sub-system in accordance with some examples of the present disclosure.

FIG. 4 is a method diagram of an example method 400 for separate cores for media management of a memory sub-system in accordance with some examples of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 400 can be performed by the processor A 150 and processor B 155 of FIG. 1 or the core manager 310 of FIG. 3. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 405, the core manager can enable a garbage collection procedure. An I/O core of the core manager and an FTL core of the core manager can operate in parallel, thereby reducing processing times and improving the overall performance of the memory sub-system.

At operation 410, the I/O core of the core manager can perform operations associated with a read process of the garbage collection procedure. For example, the I/O core can perform one or more operations associated with the read process of the garbage collection procedure for blocks of data of the memory sub-system.

At operation 415, a FTL core of the core manager can perform operations associated with a write process of the garbage collection procedure. For example, the I/O FTL core can perform one or more operations associated with the write process of the garbage collection procedure for blocks of data of the memory sub-system. Performing operations associated with the write process can occur concurrently (e.g., at least partially overlapping in time) with operation 410. In some cases, performing operations associated with the write process can occur after operation 410.

At operation 420, the I/O core of the core manager can identify source addresses for the garbage collection procedure. For example, the I/O core can identify respective source addresses for the blocks of data of the memory sub-system. In such cases, the blocks of data include valid data. The one or more operations associated with the read process can include identifying the source addresses.

At operation 425, the I/O core of the core manager can issue read commands. For example, the I/O core can issue read commands in connection with the garbage collection procedure. In such cases, each read command can include an instruction to read one of the blocks of data at a respective source address of the memory sub-system. The one or more operations associated with the read process can include issuing read commands.

At operation 430, the FTL core of the core manager can issue write commands. For example, the FTL core can issue write commands in connection with the garbage collection procedure. In such cases, each write command can include an instruction to write one of the blocks of data to a respective destination address of the memory sub-system. In some cases, the write commands can be issued according to a write rate for the garbage collection procedure. In other examples, the write commands can be issued based on a priority level of a write command with respect to other write commands. In some cases, issuing write commands can occur in parallel to operation 425. In other examples, issuing write commands can occur after operation 425.

At operation 435, the I/O core of the core manager can assign data to a purgatory state. For example, the I/O core can assign the set of data to a purgatory state based on the set of data containing invalid data. The one or more operations associated with the read process can include assigning data to a purgatory state.

At operation 440, the FTL core of the core manager can assign data to an erase pool. For example, the FTL core can assign the set of data in the purgatory state to an erase pool based on completion of all read commands for the set of data. The one or more operations associated with the write process can include assigning the data to the erase pool. In some cases, assigning the data to an erase pool can occur in parallel to operation 435. In other examples, assigning the data to an erase pool can occur after operation 435.

At operation 445, the FTL core of the core manager can perform a flush operation. For example, the FTL write can perform a flush operation as part of the write command. The flush operation can be associated with the set of data with a write request queue having a higher priority (e.g., high priority garbage collection write request queue) than a priority of a different write request queue (e.g., low priority garbage collection write request queue). In some cases, at operation 445, the FTL core can fill a set of data for a flush operation with data from blocks of data. The filling of the set of data for the flush operation can be part of the write operation.

Figure 5:
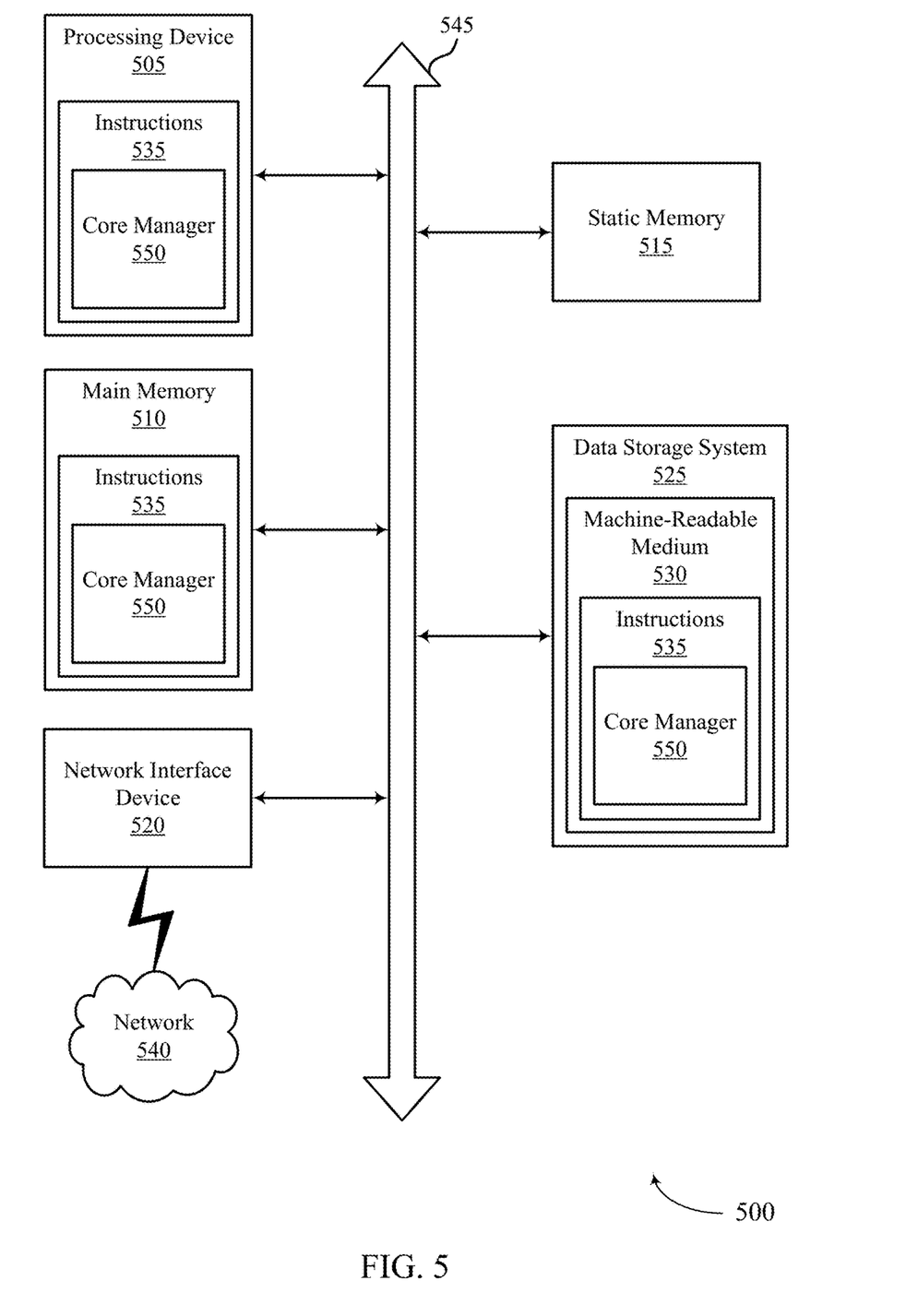
FIG. 5 is a block diagram of an example computer system in which examples of the present disclosure can operate.

FIG. 5 illustrates an example machine of a computer system 500 that supports separate cores for media management of a memory sub-system in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the processor A 150 and processor B 155 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a core manager 550 (e.g., the processor A 150 and processor B 155 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A memory system, comprising:
   processing circuitry associated with one or more memory devices and configured to cause the memory system to:

perform, by one or more controllers of the memory system, a first set of one or more operations comprising issuing, from the one or more controllers to one or more queues of the memory system, a plurality of read commands associated with a media management operation; and perform, by the one or more controllers of the memory system, a second set of one or more operations comprising issuing, from the one or more controllers to the one or more queues, a plurality of write commands associated with the media management operation, wherein issuing the plurality of read commands at least partially overlaps in time with issuing the plurality of write commands.

2. The memory system of claim 1, wherein performing the first set of one or more operations and performing the second set of one or more operations comprises the processing circuitry configured to cause the memory system to:

perform one or more second operations associated with a write process that at least partially overlaps in time with performing one or more first operations associated with a read process.

3. The memory system of claim 2, wherein performing the first set of one or more operations and performing the second set of one or more operations comprises the processing circuitry configured to cause the memory system to:

perform at least one of the one or more second operations associated with the write process after performing the one or more first operations associated with the read process.

4. The memory system of claim 2, wherein performing at least one of the one or more second operations associated with the write process occurs after performing the one or more first operations associated with the read process.

5. The memory system of claim 2, wherein to perform the one or more first operations associated with the read process, the processing circuitry is configured to cause the memory system to:

copy data to a buffer based at least in part on identifying a source address associated with the data.

6. The memory system of claim 1, wherein one or more of the plurality of write commands are issued after the plurality of read commands.

7. The memory system of claim 1, wherein the plurality of write commands are issued in accordance with a write rate for the media management operation.

8. The memory system of claim 1, wherein the plurality of write commands are issued based at least in part on a respective priority level for each of the plurality of write commands.

9. The memory system of claim 1, wherein each write command of the plurality of write commands comprises an instruction to write a block of data to a respective destination address of the memory system.

10. The memory system of claim 1, wherein the media management operation comprises a wear leveling operation.

11. The memory system of claim 1, wherein the media management operation comprises a refresh operation.

12. The memory system of claim 1, wherein the media management operation comprises a garbage collection operation.

13. The memory system of claim 1, wherein the media management operation comprises a scrub operation.

14. The memory system of claim 1, wherein the media management operation comprises a data folding operation.

15. A method, comprising:

performing, by one or more controllers of a memory system, a first set of one or more operations comprising issuing, from the one or more controllers to one or more queues of the memory system, a plurality of read commands associated with a media management operation; and performing, by the one or more controllers of the memory system, a second set of one or more operations comprising issuing, from the one or more controllers to the one or more queues, a plurality of write commands associated with the media management operation, wherein issuing the plurality of read commands at least partially overlaps in time with issuing the plurality of write commands.

16. The method of claim 15, wherein performing the first set of one or more operations and performing the second set of one or more operations comprises:

performing one or more second operations associated with a write process that at least partially overlaps in time with performing one or more first operations associated with a read process; or performing at least one of the one or more second operations after performing the one or more first operations; or both.

17. The method of claim 15, wherein one or more of the plurality of write commands are issued after the plurality of read commands.

18. A non-transitory computer-readable medium storing code, the code comprising instructions executable by one or more processors to:

perform, by one or more controllers of a memory system, a first set of one or more operations comprising issuing, from the one or more controllers to one or more queues of the memory system, a plurality of read commands associated with a media management operation; and perform, by the one or more controllers of the memory system, a second set of one or more operations comprising issuing, from the one or more controllers to the one or more queues, a plurality of write commands associated with the media management operation, wherein issuing the plurality of read commands at least partially overlaps in time with issuing the plurality of write commands.

19. The non-transitory computer-readable medium of claim 18, wherein the instructions to perform the first set of one or more operations and perform the second set of one or more operations are executable by the one or more processors to:

perform one or more second operations associated with a write process that at least partially overlaps in time with performing one or more first operations associated with a read process; or perform at least one of the one or more second operations after performing the one or more first operations; or both.

20. The non-transitory computer-readable medium of claim 18, wherein one or more of the plurality of write commands are issued after the plurality of read commands.

* * * * *